United States Patent [19]

Parker et al.

[11] 4,014,024
[45] Mar. 22, 1977

[54] NON-ROTATING ANTENNA

[75] Inventors: Ernest G. Parker, Convent Station, N.J.; Constantino Lucanera, Blauvelt, N.Y.; Richard W. Craine, Nutley, N.J.

[73] Assignee: International Telephone and Telegraph Corporation, Nutley, N.J.

[22] Filed: June 15, 1973

[21] Appl. No.: 370,488

[52] U.S. Cl. .................... 343/106 R; 343/100 SA; 343/876

[51] Int. Cl. ........................................... G01s 1/46

[58] Field of Search .......... 343/106 R, 876, 100 SA

[56] References Cited

UNITED STATES PATENTS

| | | | |
|---|---|---|---|
| 3,474,447 | 10/1969 | Melancon | 343/106 R |
| 3,560,978 | 2/1971 | Himmel et al. | 343/106 R |
| 3,670,336 | 6/1972 | Charlton et al. | 343/106 R |
| 3,747,102 | 7/1973 | Cooper | 343/106 R |

Primary Examiner—T.H. Tubbesing
Assistant Examiner—Richard E. Berger
Attorney, Agent, or Firm—John T. O'Halloran; Peter C. Van Der Sluys; Vincent Ingrassia

[57] ABSTRACT

This invention relates to a method and apparatus for producing the 135 Hz modulation component which is superimposed as the ninth harmonic on a 15 Hz component thereby producing the normally required Tacan radiation pattern. A cylindrical antenna is employed having located on and around its surface active elements such as dipoles. The 135 Hz component is produced by step-wise rotation of a binary current distribution around the cylindrical array of active elements. Since the system is binary, only two current states are employed, each having a predetermined amplitude and phase. A predetermined number of the active elements are excited by one of the signals, and the remainder of the elements are excited by the second signal. This excitation is electronically rotated in a non-symmetric manner around the cylindrical array, thereby producing the required 135 Hz component.

9 Claims, 3 Drawing Figures

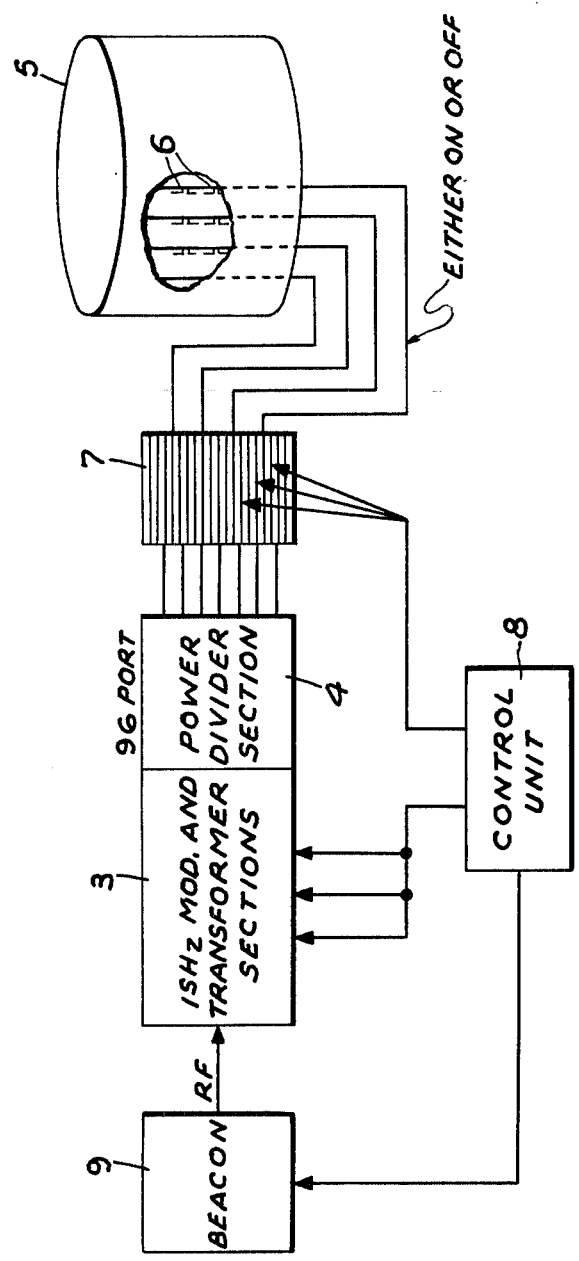
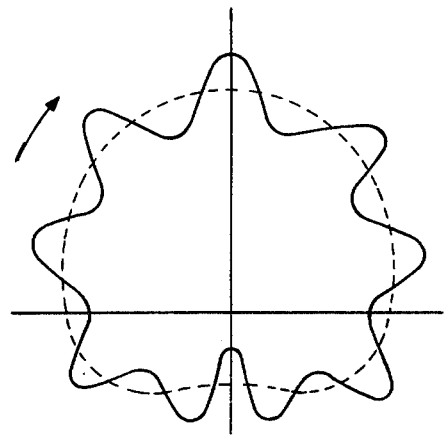

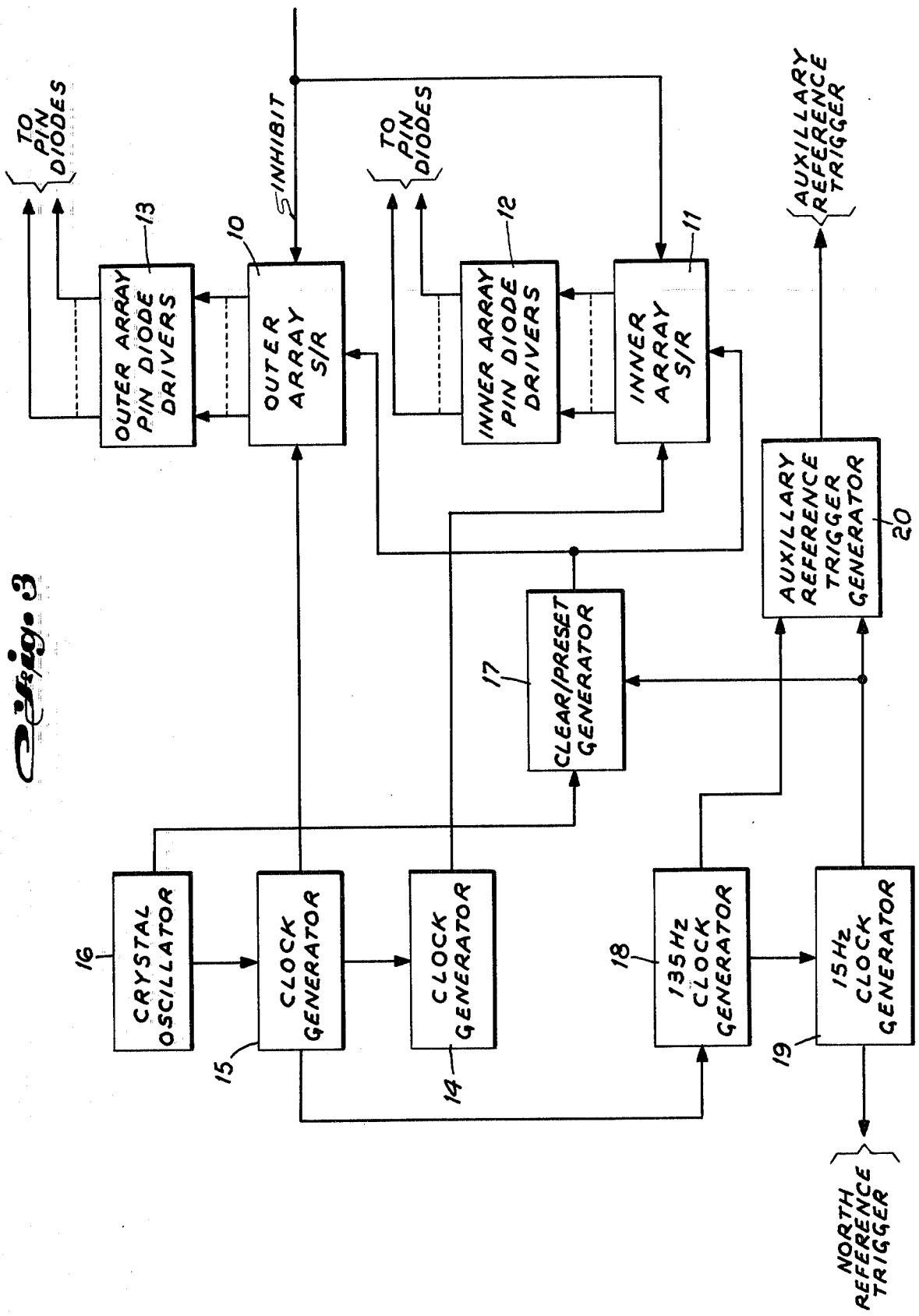

NON-ROTATING ANTENNA

BACKGROUND OF THE INVENTION

This invention relates to an electronically scanned non-rotating cylindrical Tacan antenna and more particularly to a method of producing the required 135 Hz modulation component.

All operation Tacan antenna designs fabricated and tested to date can be described by the principles set forth in "General Design Considerations for Tacan Transponder Antennas" by E. G. Parker and A. Casabona, 1957 IRE Wescon Convention Record, Volume 2, Pages 91–98. The theory presented therein applies to the special case where all primary and secondary radiating sources within the Tacan antenna are omnidirectional in a horizontal plane. While the above article was directed at the design of mechanically rotating antennas, the theory has been extended to include open arrays of fixed radiators fed and phased with either digital or analog scan. These principles have been embodied in an electronically scanned non-rotating Tacan antenna described in U.S. Pat. No. 3,560,978, which describes an antenna having a central radiator, a first plurality of radiators located concentrically around the radiator for producing the required 15 Hz modulation and a second plurality of radiators located concentrically around the first plurality of radiators and along the periphery of the base of the antenna for producing the required 135 Hz modulation component. This has the disadvantage, however, that a desired vertical pattern shaping cannot be obtained.

SUMMARY OF THE INVENTION

It is an object of the present invention to provide an electronically scanned non-rotating Tacan antenna having a cylindrical form in which the 135 Hz Tacan modulation component is produced by means of a step-wise rotation of binary current distribution around the cylindrical radiating array.

According to a broad aspect of the invention there is provided a method of producing a 135 Hz modulation component by step-wise rotation of a binary current distribution around a cylindrical radiating array of active elements, for superposition on a rotating limacon radiation pattern of the type radiated by Tacan antennas comprising generating a first signal having a first current amplitude and first phase, generating a second signal having a second current amplitude and second phase, feeding a first predetermined group of a plurality of active elements on said array with said first signal, said group located nonsymmetrically around said cylinder array, feeding the remainder of said active elements with said second signal, and electronically switching said active elements whereby said group is electronically rotated around said cylindrical array.

The above and other objects of the present invention will be more clearly understood from the following detailed description taken in conjunction with the accompanying drawings, in which:

BRIEF DESCRIPTION OF THE DRAWINGS

FIG. 1 shows a limacon pattern having a 135 Hz modulation component superimposed thereon for meeting the requirements of present Tacan systems;

FIG. 2 is a functional block diagram of the inventive antenna and associated control functions; and FIG. 3 is a functional block diagram of the control unit according to FIG. 2.

DESCRIPTION OF THE PREFERRED EMBODIMENT

The inventive radiating antenna consists of 96 vertical linear arrays of dipoles disposed cylindrically outside a conductive cylinder. The distribution lines, as well as the radiating elements for each column, are printed as a unit on strip-line sheets. With coupling affects taken into account, the straight cylindrical structure allows independent consideration of the vertical and horizontal patterns. The elevation pattern characteristics determined by the current distribution in each linear array may thus be superimposed on the horizontal plane patterns determined by the plan view currents of the ring array.

To meet elevation pattern requirements, the number of elements in a vertical array may be varied resulting in shorter or taller arrays for special applications.

In order for a clear understanding of the invention, it is necessary that a mathematical description relating to the theory of operation be presented.

As stated above, the inventive technique is based on a circular ring of vertically polarized radiating elements equally spaced around a conducting circular cylinder. Additional rings of elements are added to obtain vertical pattern shaping. However, since the problems are separable, only a single ring need be discussed mathematically.

The current distribution is binary. The element currents have either unity amplitude at zero phase or zero amplitude. The switching technique is therefore also binary, i.e., only states, on or off.

In practice, however, when current is interrupted to a given element, mutual coupling between this and the remaining fed elements results in a redistribution of currents in the vicinity of the interrupted element, including the interrupted element itself. The resultant coupled current in the interrupted element may be at an r.f. phase which is detrimental to the generation of the desired radiation pattern.

Since the desired current in the interrupted element may be viewed as a fictitious current consisting first of the normal radiated current and second of the negative of this current (the sum of the two is zero current) and since a resultant current actually appears at the element due to mutual coupling when the element is terminated, the designed terminated current can be obtained by feeding the so-called terminated element with a current which is equal in amplitude and opposite in phase to the mutually coupled currents which would occur. The technique also permits control of the percent modulation of the radiated harmonic, since it is possible to generate a vector of any magnitude in the so-called terminated element while keeping the phase of this current at 0° or 180°. It is to be noted, however, that the switching technique is still binary.

The majority of elements are fed (as a reference) unity current at zero phase. The remaining elements are fed a current of a predetermined magnitude and phase, which in the presence of mutual coupling in the antenna array will result in the desired current distribution around the antenna.

The two current states are obtained by an identical binary switch in the feed lines to each element in the radiating array. These could be incorporated in either the modulator power divider or at some other point in the r.f. distribution lines between the power divider and the radiating elements.

The above description is simplified in that it does not take into account the effect of changes with frequency over bandwidth. These effects are also accounted for as described hereinbelow and do not affect the binary technique for generation of the 135 Hz signal.

In effect, the binary switch which generates the two current states is designed to contain a predetermined frequency sensitivity to compensate the change in mutual coupling in the antenna array with frequency. Additional compensation can also be inserted to improve the elevation characteristics of the antenna over the desired bandwidth of 960 MHz through 1215 MHz. This effect requires a more complete description of the nature of the radiation from the antenna with regard to the far field spatial characteristics in both amplitude and phase.

Detailed analysis of several special cylindrical arrays applicable to Tacan are given in an article by Carter entitled "Antenna Arrays Around Cylinders", Proc, IRE, Vol. 31, No. 12, 1943, Pages 671 through 693.

From the theory developed in this article, the far field radiation pattern of a circular ring of nine short vertical dipoles around a conducting cylinder would have the following form:

$$E_o = 9 [V_o + 2i V_9 \cos 9\phi - 2V_{18} \cos 18\phi = 2i V_{27} \cos 27\phi \ldots ] \sin \theta$$

where:

$$V_n = J_n (kb \sin \theta) - J_n (ka \sin \theta) \frac{H_n^{(2)} (kb \sin \theta)}{H_n^{(2)} (ka \sin \theta)}$$

a = Cylinder radius,
b = Radius of dipole ring,
$\theta$ = Polar angle to the vertical,
$\phi$ = Horizontal angle or azimuth angle, $$k = \frac{2\pi}{\lambda} = \frac{2\pi f}{c}.$$

and $J_n$ and $H_n$ are Bessel and Hankel functions, respectively.

This theory may be further extended to provide a more complete and exact solution for a scanned Tacan antenna by the following discussion.

If it is assumed that the ring of dipoles is rotating at an angular velocity $\omega_m$ the azimuth angle in the previous expression may be replaced by the angular time function $\omega_m t$.

The first term ($V_o$) represents a carrier component while the second term ($2V_9 \cos 9 \omega_m t$) represents the ninth harmonic spatial modulation term.

The relative amount of modulation or the modulation index is given by:

$$I_9 = \frac{2i V_9}{V_o} = |I_9| e^{i\psi_9} = |I_9| \cos \psi_9 + i |I_9| \sin \psi_9$$

Since both $V_9$ and $V_o$ are complex quantities the modulation index is also complex as shown in the previous expression. The real part of the modulation index represents the index of amplitude modulation while the imaginary term represents an index of phase modulation. $|I_9|$ and $\psi_9$ are functions of the radii, frequency, and the vertical angle of observation.

The relative amount of second and third harmonics of the modulation frequency would be given by $$\frac{iV_{18}}{V_9} \text{ and } \frac{-V_{27}}{V_9}$$

respectively.

These ratios are also complex and must be related to the carrier phase to determine the relative amounts of second and third harmonic amplitude modulation actually present at any frequency or elevation.

The second and third harmonics arise from the geometry and can become quite large as the radius of the antenna is increased.

There is also another source of second harmonic amplitude modulation which arises from the presence of phase modulation. The modulated signal would have the following form:

$$S = [1 + I_9 \cos \psi_9 \cos 9\omega_m t] \cos \omega_k t + [ I_9 \sin \psi_9 \cos 9\psi_m t] \sin \omega_k t$$

where $\omega_m$ is the modulation frequency and $\omega_k$ the carrier frequency.

Consider the following expansion of a pure phase modulated signal with a modulation frequency $9\omega_m$:

$$\Phi = \cos (\omega_k t - A \cos 9\omega_m t) = [J_o(A) - 2 J_2(A) \cos 18\omega_m T + 2 J_4(A) \cos 36\omega_m t - \ldots ] \cos\omega_k t + 2[J_1(A) \cos 9\omega_m t - 2 J_3(A) \cos 27\omega_m t + \ldots ] \sin\omega_k t$$

With "A" assumed to be less than 0.5, the Bessel terms $J_3(A)$ and higher may be neglected. Normalizing both sides to $J_o$ gives the same form as the equation for "S" above:

$$\Phi = \left[ 1 - \frac{2J_2(A)}{J_o(A)} \cos 18\omega_m t \right] \cos \omega_k t + \left[ 2 \frac{J_1(A)}{J_o(A)} \cos 9\omega_m t \right] \sin \omega_k t$$

The above expression shows that associated with the phase modulation term $2J_1(A)/J_o(A)$ there is an in-phase second harmonic amplitude modulation term, $2J_2(A)/J_o(A)$.

Referring to the previous expression for S, we may therefore equate $2J_1(A)/J_o(A)$
to the imaginary part of the modulation index, ($I_9 \sin \psi_9$) and solve for the value of A:

$$I_9 \sin \psi = \frac{2J_1(A)}{J_o(A)}.$$

where absolute value of $I_9$ is assumed.

Since the magnitude of $I_9$ is less than 0.5, the following approximation is valid, resulting directly in the value of A:

$$I_9 \sin \psi = \frac{2J_1(A)}{J_o(A)} \approx A$$

The percent of second harmonic amplitude modulation that will be present in the signal is given by:

$$\text{Per Cent Second Harmonic} = 100 \frac{\frac{2J_2(A)}{J_0(A)}}{I_9 \cos\psi}$$

This expression may also be simplified by noting that for A<0.5:

$$\frac{2J_2(A)}{J_0(A)} \approx 0.25 A^2$$

Upon substituting the previously found value of "A", the expression for the percentage of second harmonic reduces to the following:

$$\text{Per Cent Second Harmonic} = 25 \, I_9 \frac{\sin^2\psi}{\cos\psi}$$

To summarize, when the modulation index is a complex number expressible as $Ie^{i\psi}$, where I<0.5, an amplitude modulation detector will detect not only a modulation of relative amplitude $I\cos\psi$ but an additional amplitude modulation of double frequency whose amplitude, expressed as a percentage of the fundamental component, is given by the expression:

$$\text{Per Cent Second Harmonic} = \frac{25 \, I \sin^2\psi}{\cos\psi}$$

Thus, when phase modulation is present in the 135 Hz Tacan signal, there will also be a 270 Hz component described by the previous equation in terms of the magnitude ($I_9$) and phase ($\psi_9$) of the modulation index.

To further clarify the significance of the complex modulation index, consider the following:

The real part of the modulation index ($I_9 \cos\psi$) is the normally defined index of amplitude modulation.

The imaginary part of the modulation index ($I_9 \sin\psi$) is the index of phase modulation that would be found as follows for the 135 Hz of ninth harmonic component.

At a fixed point in space, measure and record the r.f. phase $\Phi(t)$ of the received signal over one period T of the antenna pattern rotation. $\Phi(t)$ expressed in radians will be a continuously varying function over the period T. Since $\Phi(t)$ is a continuous periodic function, it may be expressed as a Fourier series as shown below:

$$\Phi(t) = \Phi_o + \Phi_1 e^{i\omega t} + \Phi_2 e^{i2\omega t} + \Phi_3 e^{i3\omega t} + \ldots$$

where:
$\omega = 2\pi/T$

The magnitude of $\Phi_9$ in the above series expression is the index of phase modulation.

It has been shown that a mathematical solution exists for the far-field pattern of an array of vertical dipoles around a conducting cylinder. Rotation of the pattern of an appropriate array produces a Tacan spatial modulation. The theory permits calculation of the modulation index and the relative amount of higher harmonics in terms of the parameters of the array; that is, diameter of cylinder, diameter of radiating array, frequency of radiated signal, and elevation angle of observation. The theory predicts that in the general case the modulation index is a complex number which may be given in the exponential form $I_9 e^{i\psi_9}$ where $I_9$ is the magnitude and $\psi 9$ is the exponential angle.

In the inventive antenna, there will be a total of 96 radiating elements. Nine equally spaced pairs of radiating elements will be turned off while the r.f. input to the 78 remaining elements is uniform in amplitude and phase. The pairs are spaced 10° (in the time average) for complete cancellation of the 18th harmonic. From Carter's solution described in "Antenna Arrays Around Cylinders", P.S. Carter, Proc, IRE, Vol. 31, No. 12, 1943, Pages 671 through 693, the resultant pattern in azimuth, $\phi$, and elevation, $\theta$, for dipole radiators would be as follows:

$$\psi = [78V_o - 18 \quad 2iV_9 \cos 9\phi + 18 \quad 2iV_{27} \cos 27\phi \ldots] \sin\theta$$

The vertical directivity of the dipole, $\sin\theta$, multiplies each term in the expression. Similarly, if vertical arrays of dipoles are used, the array directivity would simply replace the $\sin\theta$ term in the previous expression. This shows that the array directivity and the modulation function may be treated as two separate problems.

In the second edition of "Electromagnetic Waves and Radiating Systems", Jordain and Balmain indicate that this assumption is correct. In chapter 13.20 "Dipole and Slot Arrays around Cylinders" they show that Carter's solution for the azimuth pattern may be used as a unit pattern for applying the principle of multiplication of patterns.

The modulation index for the 135 Hz component is found by normalizing the $V_9$ term to the carrier term:

$$I_9 e^{i\psi_9} = \frac{18\sqrt{2}}{78} \frac{|V_9|}{|V_o|} e^{i(\phi_9 - \pi/2 - \phi_0)}$$

where $\phi_9$ and $\phi_o$ are derived from the real and imaginary parts of $V_9$ and $V_o$ respectively.

The 18th harmonic or 270 Hz signal is cancelled by the previously mentioned considerations. If there were no cancellation, the magnitude of this term expressed as a percent of the magnitude of the 135 Hz term would be:

$$\frac{|V_{18}|}{|V_9|} \times 100$$

For the indicated 96-element array, the relative magnitude of the 27th harmonic or 405 Hz term is given by:

$$\frac{|V_{27}|}{|V_9|} \times 100$$

It should be remembered that the expression for $V_n$ is governed by the following:

$$V_n = J_n(\rho_2) - J_n(\rho_1) \frac{H_n^{(2)}(\rho_2)}{H_n^{(2)}(\rho_1)} = |V_n| e^{i\phi_n}$$

$$\rho_1 = \frac{2\pi fa}{c} \sin\theta = \frac{2\pi a}{\lambda} \sin\theta$$

where $a$ is the cylinder radius and:

$$\rho_2 = \frac{2\pi f b}{c} \sin\theta = \frac{2\pi b}{\lambda} \sin\theta$$

where $b$ is the radius of the dipole array.

A digital computer program was written to evaluate the values:

$$|V_o|, \phi_o, |V_9|, \phi_9, |V_{1K}|, \phi_{1K}, |V_{27}|, \phi_{27}, I_9\cos\psi_9, I_9\sin\psi_9$$

and the expression:

$$\frac{25\, I_9 \sin^2\psi}{\cos\psi}$$

for a large number of different radii.

It was found that the spacing of the radiating elements from the cylinder wall ($\rho_2 - \rho_1$) provides one means for control of the percent of modulation. This spacing in radians will itself vary ±12 percent over the bandwidth due to the change in wavelength, however, by keeping the spacing small the variation will also be small. It was also experimentally determined that a small spacing of the elements from the cylinder wall is not critical to the task of obtaining a good impedance match for the elements.

The spacing used for the calculations of the proposed antenna parameters was $\pi/3$ radians; that is:

$$\rho_2 = \rho_1 + \pi/3$$

The above terms were evaluated in steps of 0.5 radians from $\rho_1 = 5.5$ radians to $\rho_1 = 30$ radians.

To find the percent of 135 Hz and the relative percent of 270 Hz signal at any given frequency and elevations for an antenna of radius a, evaluate the radius factor (effective radius):

$$R = \rho_1 = \frac{2\pi a \sin\theta}{\lambda},$$

and pick off the value of percent of 135 Hz and relative percent of 270 Hz from the curve.

To select the correct antenna diameter or radius one must evaluate the extremes in effective radius or radius factor. The largest value will occur at the horizon for 1215 MHz:

$$\rho_{max} = \frac{2\pi a}{\lambda\, 1213}$$

while the smallest value will occur at the highest elevation angle at 960 MHz:

$$\rho_{min} = \frac{2\pi a}{\lambda\, 960} \sin\theta_{max}$$

The specification limit of 12 percent minimum will be met between the limits of 10.2 and 20.8 radians. However, the 15 percent limit of second harmonic will be slightly exceeded at the larger radius. The maximum permitted radius, therefore, must be reduced to 20.3 radians. Using this value for maximum radius factor, we may compute the resulting radius factor for 50° elevation at 960 MHz:

$$\rho = \frac{\lambda\, 1215}{\lambda\, 960} \rho_{max} \sin 40\text{ degrees} = 10.5 \text{ radians}$$

Note that for this choice of radius factor, the specification limits for harmonic content and elevation coverage can be just met. However, to provide margins for improved modulation characteristics near the horizon at the high end of the band, a further reduction in the maximum radius factor to approximately 19 radians is proposed. This charge results in substantial improvement in low angle performance where the operational requirements are most critical and results in only minor reduction in elevation coverage from 50° to 47° through the lower channels.

The resulting design configuration proposed uses a 29-inch radius to provide an improved horizon signal at the higher frequencies and slightly reduced elevation coverage at the low end of the band. Below a frequency of 1040 MHz, the percent of 135 Hz modulation at +50° elevation will be less than 12 percent. At 960 MHz, the percent of 135 modulation will fall below 12 percent at elevation angles exceeding 46.7°. The situation improves with frequency, and at all frequencies above 1040 MHz, the percent of modulation will exceed the 12 percent limit for 50° elevation.

With the chosen radius of 29 inches, no consideration need be given for suppression of the 405 Hz component, since the largest effective radius will be below 20 radians. The 270 Hz signal which could be very large in this region is cancelled by the previously mentioned technique.

The technique suggests itself from the mathematical analysis which has been presented and would require separation of the modulated from the unmodulated signals. By provision of appropriate phase path differences, the relative phase shift which takes place as a result of frequency change can be corrected to a first order.

It has been shown that the array factor or vertical directivity could be treated as a separate problem from the horizontal azimuth modulation problem. A computer evaluation of the performance characteristics of the proposed antenna configuration was given in terms of a single parameter, the radius factor or effective radius. It was shown that the radius factor was itself a function of the array diameter, the r.f. frequency and the elevation angle of observation.

One of the unique features of the inventive concept is that the phase accuracy of the bearing signal is determined exclusively by the geometry of the radiating structure and the timing of the events. It has been shown that the inherent bearing accuracy in an idealized structure has no limitations. The high precision digital control virtually eliminates timing errors so that only irregularities in the geometry need be considered in the generation of errors. With the modulator voltages removed, the r.f. input to the radiating elements of the proposed antenna will be equal in amplitude and phase, and the geometrical considerations relate primarily to maintaining these currents uniform. To minimize the results of any irregularities in timing and geometry and further to provide the most in fail-safe protection, a large number of radiating elements has been provided.

FIG. 1 shows a rotating limacon pattern having a 135 Hz modulation component superimposed thereon for meeting the requirements of present Tacan systems.

The 135 modulation component (ninth harmonic spatial function) is generated by sequentially switching the r.f. amplitude and phase of radiators 6 located on the outer surface of antenna 5 shown in FIG. 2. Radiators 6 are coupled to the low impedance end of r.f. impedance transformer sections 3 via a power divider section 4. The technique of sequentially switching an array of radiators on the antenna to generate the 135 Hz component is not related to the problem of generating the 15 Hz modulation component. A further discussion of the generation of the 15 Hz component can be found in U.S. Pat. Application Ser. No. 352,154, filed Apr. 18, 1973, now Pat. No. 3,845,485, entitled Non-Rotating Antenna by the same inventors and assigned to the assignee of the present invention. This application is hereby incorporated in its entirety by reference.

This method of generating the 135 Hz Tacan modulation is based on a stepwise rotation of a binary current distribution around a cylindrical radiating array. The capability of such a binary current distribution for producing a far field Tacan modulation component having sufficient bandwidth and appropriate elevation characteristics has been mathematically demonstrated above. Shutting off the current input to selected array elements presents certain problems since there results mutually coupled currents in the radiating array. However, these problems can be overcome when the elements are fed with currents of selected amplitude and phase, such as to combine with the mutually coupled currents in the elements to produce a selected resultant current with predictable results on the ninth harmonic modulation component. FIG. 2 shows a 96 element cylindrical radiating array 5 where each of the radiating elements 6 consists of an array of three dipoles. These elements, together with a branch line hybrid power divider 4, can be printed on dielectric sheets.

The proposed technique is based on a circular ring of vertically polarized radiating elements 6 equally spaced around a conducting cylinder 5. This arrangement has the advantage over that described in U.S. Pat. No. 3,560,978, in that the latter cannot be easily extended vertically. According to the arrangement, additional rings of elements may be added to obtain a desired vertical pattern shaping. A further distinction over U.S. Pat. No. 3,560,978 is that the inventive arrangement employs active elements rather than parasitic elements. It should be noted that the switching sequence of the active elements, according to the present invention, is non-symmetric. Since the problems are separable, only a single ring is discussed below.

The current distribution described is binary. The element currents have either a first amplitude at a first phase or a second amplitude at a second phase. The switching technique is therefore also binary, i.e., only two states, on or off.

When current is interrupted to a given element, mutual coupling between this and the remaining fed elements results in a redistribution of currents in the vicinity of the interrupted element including the interrupted element itself. The resultant coupled current in the interrupted element may be at an r.f. phase which is detrimental to the generation of the desired radiation pattern.

Since the desired current in the interrupted element may be viewed as a fictitious current consisting first of the normal radiated current, and second of the negative of this current, i.e., the sum of the two currents is zero, and since a resultant current actually appears at the element due to mutual coupling when the element is terminated, the desired terminated current can be obtained by feeding the so-called terminated element with a current which is equal in amplitude and opposite in phase to the mutually coupled currents which would occur. This technique permits control of the percent modulation of the radiated harmonic since it is possible to generate a vector of any magnitude in the so-called terminated elements while keeping the phase of this current at 0° or 180°.

The first amplitude and first phase mentioned above could be unity current at zero phase which is used as a reference and fed to the majority of elements. The remaining elements are fed a current of a predetermined magnitude and phase, which, in the presence of mutual coupling in the antenna array, will result in the desired current distribution around the antenna.

The two current states are obtained by identical binary switches in the feed lines to each element in the radiating array. These could be either incorporated in the modulator power divider or at some other point in the r.f. distribution lines between the power divider and the radiating elements as shown in FIG. 2. The switching sections are denoted 7 in FIG. 2.

It should be noted that the above description is simplified in that it does not take into account the affect of changes with frequency over the bandwidth. These effects will be accounted for below and do not affect the binary technique for generation of the 135 Hz signal.

In effect, the binary switch which generates the two current states is designed to contain a predetermined frequency sensitivity to compensate the change in mutual coupling in the antenna array with frequency. Additional compensation can be inserted to improve the elevation characteristics of the antenna over desired bandwidth. This effect requires a more complete description of the nature of the radiation from the antenna with regard to the far field spatial characteristics in both amplitude and phase.

Of the 96 equally spaced elements in the radiating array, nine pairs are turned off at any one instant of time. The remaining 78 elements result in a far field pattern given by $[78V_o]$.

If it is assumed that the relative current and phase of the remaining 18 elements is given by $\alpha e^{j\beta}$ relative to the current in the 78 elements, the resultant pattern from these elements is given by:

$$\alpha e^{j\beta} [9V_o - 18\sqrt{2i}\, V_9 \cos 9\phi + 18\sqrt{2i}\, V_{27} \cos 27\phi \ldots]$$

Adding the two far field patterns given the resultant array pattern for the antenna.

The carrier term is given by:

$$(78 + 9\alpha e^{j\beta})V_o$$

while the ninth harmonic modulation is given by:

$$18\alpha \sqrt{2}\, e^{j\beta}\, (-iV_9)$$

The index of modulation is therefore the ratio of these terms:

$$I = \frac{18\alpha \sqrt{2} \, e^{J\beta} \, (-iV_9)}{(78 + 9\alpha e^{J\beta}) \, V_o}$$

It should be noted that the factor in the above expression $$ "\left(\frac{-iV_9}{V_o}\right)" $$

arises only from the gemoetry of the array while the factor $$ "\left[\frac{18\alpha \sqrt{2} \, e^{J\beta}}{(78 + 9\alpha e^{J\beta})}\right]" $$

arises from the choice of current distribution in the array. It should also be noted that aside from a frequency dependence which may or may not occur in the feeding of the array elements, all of the dependence on array diameter, element position, elevation angle and frequency are contained in the former factor. Both factors are complex numbers and in general the modulation index will also be complex. Referring again to FIG. 2, the 15 Hz modulator and transformer sections 3 and the power divider section 4 consists of an integral unit with one r.f. input port and 96 output ports. Both input and output ports are matched so that standard interconnecting cables can be used.

The 15 Hz modulation is generated in a coaxial waveguide by exciting an $H_{11}$ mode in the coaxial guide and digitally stepping the azimuthal orientation of the mode. The magnitude of the $E_R$ component of the TEM field is uniform in azimuth within the guide of the magnitude of the $E_R$ component of the $H_{11}$ field is sinusoidal in azimuth. The combined modes constitute a spatial modulation within the waveguide which, when stepped around the guuide at the 15 Hz rate, becomes the fundamental component of the Tacan signal within the guide.

The moded signal is tapped from the coaxial line by 96 equally spaced radial strip lines. The combined static TEM and $H_{11}$ modes result in a progressive sinusoidal variation in signal amplitude around the 96 output lines. When the $H_{11}$ mode is digitally stepped around the guide, each of the output lines will experience a stepped sinusoidal amplitude variation with advancing modulation phase (15 Hz) from line to line.

Assuming 96 steps per complete rotation of the $H_{11}$ mode at a rate of 1440 steps per second, there results a 15 Hz sinusoid. The 96 lines are connected respectively to the radiating arrays located symmetrically around the conducting cylinder.

The 135 Hz modulation is formed by means of the spatial filtering of the radiating arrays.

When the signal to nine equal spaced pairs of radiating arrays is interrupted, the resulting far field radiation pattern will be moded in the ninth spatial harmonic. The first mode (15 Hz component) will also be present by reason of the sinusoidal variation arising from the 15 Hz modulator. The super position of the 15 Hz signal on the 135 Hz modulator results in generation of intermodulation and the required Tacan radiation pattern.

A transformer is required to match the input impedance to the impedance of the 78 parallel lines. This transformer is also included in the design of the modulator power divider unit.

The 135 Hz modulation is accomplished by simply cutting off the signal input to a selected 18 lines by means of a suitable switch. To this end, PIN diode switches are employed.

Control unit 8 generates commands which control the state of the PIN diode switches in the system. Control unit 8 is shown in more detail in FIG. 3. In addition to generating commands, the control unit supplies two reference trigger signals, the north reference trigger and the auxiliary reference trigger.

Referring to FIG. 3, the above-mentioned commands are generated by decoding selected outputs of two recirculating shift registers 10 and 11 and sending the resulting signal to the inputs of PIN diode driver circuits 12 and 13. The PIN diode drivers then cause PIN diode switches to either conduct or be back biased and thereby determine the state of the output configuration of the system at any given time.

The two shift registers both contain 96 flip-flops. The inner array register controls the states of the 32 inner PIN diode switches and the other array register controls the states of the 96 outer PIN diode switches. The outer PIN diode switches are coupled to the PIN diodes used in generating the 135 Hz modulation component. The 32 inner PIN diode switches are coupled to the PIN diodes in the power divider which are employed to generate the 15 cycle modulation component as more fully described in the above cited U.S. Pat. Application, Ser. No. 352,154.

The cycle starts by clearing all flip-flops, then presets a given pattern of ones and zeroes into the registers. Every third register is decoded from both the inner array register and the outer array register; however, the output from the inner array register drives one PIN diode driver while the output from the outer array register drives three PIN diode drivers. The PIN diode drivers are selected for their position in the array; as the registers are clocked a composite time average function is produced by the entire array.

The inner array is clocked by a first clock generator 14 (C1) and the outer array is clocked by a second clock generator 15 (C2) (three times the frequency of the inner array). At the end of 96 C1 clock pulses the inner array shift register has made a complete cycle and the initial conditions are again present in this register. At the end of 96 C2 clock pulses, the original initial conditions are also present in the outer array shift register; however, the initial condition itself has progressed only one-third of the way around the array. This is due to symmetry considerations in the outer array. The outer array requires 288 C2 pulses or three cycles of the register to complete one full cycle of the array. Clock generator 16 is controlled by crystal oscillator 16.

Thus, as the initial conditions are set into the inner array, three PIN diodes conduct; after the first clock pulse two of the original three are still conducting while the third position advances by one; after the second clock pulse the first and third PIN diodes remain conducting while the second advances by one position; after the third clock pulse the second and third PIN diodes remain conducting while the first is advanced by one. For example, assume that at $t = 0$ PIN diodes 1, 5, 9 are conducting. After the first clock pulse ($t = 1$) PIN diodes 1, 5, 10 would be conducting; at $t = 2$, 1, 6, 10 would conduct; and at $t = 3$, 2, 6, 10 would conduct. After three clock pulses, the three elements which are now on are advanced one array position from the initial condition. This pattern is continued for all 32 inner diodes until $t = 96$, when 1, 5, 9 would again conduct. The inner array register repeats this cycle 15 times per second; however, to ensure no false information is propagated by the system for more than one cycle, the register is cleared then preset at the beginning of each cycle.

The outer array register basically operates in the same manner as the inner array; however, at $t = 0$, 18 PIN diodes are conducting; at $t = 1$, six of the original 18 advances to the next position to the array; at $t = 2$, an additional six advance; and at $t = 3$, an additional six advance, then at the end of three clocks the 18 elements which are now on are each advanced one array position from the initial condition. At any given change the six elements changing consist of three pairs located precisely 120° apart.

At the end of 96 clock pulses, the initial conditions will repeat by symmetry although the initial condition itself has only progressed one-third of the way around the array. Similarly, the initial condition will repeat at the end of 192 clock pulses at which time it will have progressed two-thirds of the way around the array. At the end of 288 clock pulses, one full cycle of the array will be completed.

The original initial conditions appear in the outer array shift register 45 times per second; however, to ensure no false information is propagated for more than three cycles, this register is cleared then preset at the beginning of each third cycle via clear/preset generator 17.

Both the inner and outer registers can be preset concurrently. The appearance of north reference trigger is used to accomplish this action. If the system receives an inhibit from the Tacan transponder, the inhibit will cause the registers to remain in their current state until it is removed.

Also shown in FIG. 3 are the 135 Hz clock generator 18 and the 15 Hz clock generator 19 which control the auxiliary reference trigger generator 20 and the clear/preset generator 17.

The specific switching sequence is a function of a particular problem to be solved and a particular environment. It is to be understood that the foregoing description of specific examples of this invention is made by way of example only and is not to be considered as a limitation on its scope.

We claim:

1. A method of producing a 135 Hz modulation component by step-wise rotation of a binary current distribution around a cylindrical radiating array of active elements, for superposition on a rotating limacon radiation pattern of the type radiated by Tacan antennas comprising:
   generating a first signal having a first current amplitude and first phase;
   generating a second signal having a second current amplitude and second phase;
   feeding a first predetermined group of a plurality of active elements on said array with said first signal, said group located non-symmetrically around said cylindrical array;
   feeding the remainder of said active elements with said second signal; and
   electronically switching said active elements whereby said group is electronically rotated around said cylindrical array.

2. A method according to claim 1 wherein said cylindrical array contains 96 active elements.

3. A method according to claim 2 wherein said group consists of 18 active elements.

4. A method according to claim 1 wherein said first signal has unity current amplitude and zero phase.

5. A method according to claim 1 wherein said first and second signals are produced by identical binary switches.

6. A method according to claim 5 wherein said binary switches are PIN diode switches.

7. A non-rotating electronically scanned cylindrical antenna for contributing a 135 Hz modulation component to a far field radiation pattern comprising:
   a first source of a signal having a first current amplitude and first phase;
   a second source of a signal having a second current amplitude and second phase;
   a plurality of active elements located on the outer surface of said cylindrical antenna;
   first means for coupling said first source to a predetermined number of said plurality of active elements, said predetermined number located non-symmetrically around said cylindrical array;
   second means for coupling said second source to the remainder of said plurality of active elements; and
   means for switching said active elements whereby said predetermined number coupled to said first source is rotated around the array.

8. A cylindrical antenna according to claim 7 wherein each of said active elements are dipoles.

9. A cylindrical antenna according to claim 7 wherein said antenna is three levels high, each level containing 32 active elements located around and on the surface of said cylindrical antenna.

* * * * *